(12) United States Patent
Kim et al.

(10) Patent No.: US 12,265,965 B2
(45) Date of Patent: Apr. 1, 2025

(54) SYSTEM AND METHOD FOR PREVENTING SUSPICIOUS TRANSACTIONS IN DISTRIBUTED LEDGER

(71) Applicant: dsrv labs Co., Ltd., Seoul (KR)

(72) Inventors: Ji Yun Kim, Suwon-si (KR); Jeong Ho Jeon, Seoul (KR); Jong Kwang Kim, Incheon (KR); Hyung Kyu Choi, Seoul (KR); Hyug Bin Kwon, Seoul (KR)

(73) Assignee: dsrv labs Co., Ltd., Seoul (KR)

( * ) Notice: Subject to any disclaimer, the term of this patent is extended or adjusted under 35 U.S.C. 154(b) by 337 days.

(21) Appl. No.: 17/790,012

(22) PCT Filed: Mar. 26, 2020

(86) PCT No.: PCT/KR2020/004086
§ 371 (c)(1),
(2) Date: Jun. 29, 2022

(87) PCT Pub. No.: WO2021/137354
PCT Pub. Date: Jul. 8, 2021

(65) Prior Publication Data
US 2023/0045098 A1    Feb. 9, 2023

(30) Foreign Application Priority Data

Dec. 31, 2019 (KR) .................. 10-2019-0179106
Feb. 18, 2020 (KR) .................. 10-2020-0019849

(51) Int. Cl.
*G06Q 20/40* (2012.01)
*G06Q 20/36* (2012.01)
(Continued)

(52) U.S. Cl.
CPC ..... *G06Q 20/4016* (2013.01); *G06Q 20/3678* (2013.01); *G06Q 20/3825* (2013.01);
(Continued)

(58) Field of Classification Search
USPC ........................................... 705/69
See application file for complete search history.

(56) References Cited

U.S. PATENT DOCUMENTS 11,200,569 B1* 12/2021 James et al.
11,756,031 B1*  9/2023 Hamera et al.
2017/0330180 A1* 11/2017 Song et al.

FOREIGN PATENT DOCUMENTS

| KR | 10-1710918 B1 | 2/2017 |
| KR | 10-1799343 B1 | 11/2017 |
| KR | 10-2019-0122430 A | 10/2019 |

OTHER PUBLICATIONS

International Search Report issued in PCT/KR2020/004086; mailed Sep. 29, 2020.
(Continued)

*Primary Examiner* — James D Nigh
*Assistant Examiner* — Yin Y Choi
(74) *Attorney, Agent, or Firm* — Studebaker Brackett PLLC (57) ABSTRACT

A system and method for preventing hacking of blockchain is proposed. The system includes a cryptocurrency owner configured to own a cryptocurrency wallet storing a cryptocurrency, a public key, and a private key, and capable of setting monitoring-subjected data and monitoring-excluded data, a hacking countermeasure system configured to check status of the cryptocurrency wallet by being connected to the cryptocurrency owner to receive the cryptocurrency and the public key, invalidate a hacking transaction when the hacking transaction matching the monitoring-subjected data is received, and allow the cryptocurrency to be traded by opening the cryptocurrency wallet with the private key and process transaction details into a block file when a monitoring-excluded transaction matching the monitoring-excluded data is received, and a blockchain network config- (Continued)

ured to receive the block file from the hacking countermeasure system and duplicate the block file into a plurality of block files to distribute and store each block file.

1 Claim, 7 Drawing Sheets (51) Int. Cl.
*G06Q 20/38* (2012.01)
*H04L 9/00* (2022.01)
*H04L 9/40* (2022.01)

(52) U.S. Cl.
CPC ....... *G06Q 20/3829* (2013.01); *G06Q 20/389* (2013.01); *H04L 9/50* (2022.05); *H04L 63/1441* (2013.01); *G06Q 2220/00* (2013.01)

(56) References Cited

OTHER PUBLICATIONS

An Office Action; "Notification of Reasons for Refusal," issued by the Korean Intellectual Property Office on May 31, 2021, which corresponds to Korean Patent Application No. 10-2020-0019849.

\* cited by examiner

SYSTEM AND METHOD FOR PREVENTING SUSPICIOUS TRANSACTIONS IN DISTRIBUTED LEDGER

CROSS-REFERENCE TO RELATED APPLICATIONS

This application is a National Phase application of International Application No. PCT/KR2020/004086, filed on Mar. 26, 2020, which claims benefit of priority to Korean Patent Application Nos. 10-2019-0179106 filed on Dec. 31, 2019 and 10-2020-0019849 filed on Feb. 18, 2020, the entire content of which is incorporated herein by reference.

TECHNICAL FIELD

The present disclosure provides a technology that is related to a system preventing blockchain from hacking.

BACKGROUND ART

Currently, blockchain technology that generates management-subjected data into a block and manages the blocked data on the basis of a P2P method is gradually expanding. Such blockchain technology provides a storage environment of distributed data based on connecting links in a form of generated chains. No one may arbitrarily modify data stored in such a storage environment, and anyone is able to view a result of a change. This essentially represents a form of distributed data storage technology. The distributed data storage technology is characterized in that a change list that records continuously changing data to all participating nodes is provided and the change list is unable to be arbitrarily manipulated by any operator of the distributed nodes.

Transactions of most cryptocurrencies, including Bitcoin, use distributed data storage technology. Since the cryptocurrencies traded on the basis of the distributed data storage technology are written in a decentralized electronic ledger, a server is operated on each computer of many users who execute blockchain software, whereby transactions may be made freely between individuals without a central bank.

Such cryptocurrency transactions have been recognized as safe in that the transactions are made on the distributed data storage technology. However, in response to the development of the distributed data storage technology, technology for hacking a blockchain has also developed.

Accordingly, cases of hacking a blockchain occur frequently. For example, in March 2019, about 15 billion Korean won worth of EOS held by Bithumb was stolen by a blockchain hack. In addition, again in another case, in June, about 35 billion Korean won worth of cryptocurrency was stolen by a blockchain hack. In addition, in around November 2019, about 58 billion Korean won worth of Ethereum held by Upbit was stolen by a blockchain hack.

As described above, as an astronomical amount of damage is caused through the blockchain hacks, the need for developing a system that blocks and prevents blockchain hacking is growing.

DISCLOSURE

Technical Problem

The present disclosure is to solve the above described problems, and relates to a system and method for preventing suspicious transactions in a distributed ledger, wherein theft of cryptocurrencies traded on the blockchain technology is prevented by way of blocking blockchain hacks.

The problems of the present disclosure are not limited to the above-mentioned technical problems, and other technical problems not described above will be clearly understood by those skilled in the art from the description of the claims.

Technical Solution

According to the present disclosure for achieving the objectives to solve the above problems, a system for preventing suspicious transactions in a distributed ledger includes:

a cryptocurrency owner configured to own a cryptocurrency wallet storing a cryptocurrency, a public key, and a private key, and capable of setting monitoring-subjected data suspected of being hacked and monitoring-excluded data not suspected of being hacked;

a hacking countermeasure system configured to check status of the cryptocurrency wallet by being connected to the cryptocurrency owner through a network and receiving the cryptocurrency and the public key from the cryptocurrency owner, transmit a hacking countermeasure transaction that invalidates a hacking transaction when the monitoring-subjected data is received and the hacking transaction matching the monitoring-subjected data is received, and transmit a monitoring-excluded transaction to a blockchain network so that the cryptocurrency is transacted when the monitoring-excluded transaction matching the monitoring-excluded data is received; and the blockchain network configured to receive transactions from the hacking countermeasure system to process the transaction details into a block file, and then duplicate the blockfile into a plurality of block files to distribute and store each block file in a plurality of nodes sharing each block file.

The hacking countermeasure system may include:
a filter database part configured to receive and store the monitoring-subjected data and the monitoring-excluded data from the cryptocurrency owner;
a countermeasure transaction storage part comprising a signature check transaction module configured to receive and store the private key from the cryptocurrency owner or request a signature from the cryptocurrency owner by using the private key, and a hacking countermeasure transaction module configured to invalidate a hacking-suspected transaction;
a transaction reception part configured to receive transaction data transmitted from the nodes;
a transaction control part configured to receive the monitoring-subjected data and the monitoring-excluded data by being connected to the filter database part, and receive the transaction data by being connected to the transaction reception part, thereby comparing the transaction data with the monitoring-subjected data or the monitoring-excluded data; and
a transaction transmission part configured to transmit, to the blockchain network, the transaction data received by the transaction reception part or the hacking countermeasure transaction stored in the countermeasure transaction storage part in response to an operation result of the transaction control part.

When receiving a signature request transaction from the countermeasure transaction storage part,
the cryptocurrency owner may convert the signature request transaction into a signed transaction by using the private key.

According to the present disclosure for achieving the objectives to solve the above problems, a method for preventing suspicious transactions in a distributed ledger includes:

step (A) of owning, by a cryptocurrency owner, a cryptocurrency wallet storing a cryptocurrency, a public key, and a private key, and setting monitoring-subjected data suspected of being hacked and monitoring-excluded data not suspected of being hacked;

step (B) of checking, by a hacking countermeasure system, status of the cryptocurrency wallet by receiving the cryptocurrency and the public key from the cryptocurrency owner, invalidating a hacking transaction when the monitoring-subjected data is received and the hacking transaction matching the monitoring-subjected data is received, and allowing the cryptocurrency to be traded and transmitting transaction details when a monitoring-excluded transaction matching the monitoring-excluded data is received; and step (C) of receiving, by a blockchain network, transactions from the hacking countermeasure system to process the transaction details into a block file, and then duplicating the block file into a plurality of block files to distribute and store each block file in a plurality of nodes sharing each block file.

Advantageous Effects

The system and method for preventing the suspicious transactions in the distributed ledger according to the present disclosure prevent cryptocurrencies to be normally traded by transactions suspected of hacking, and prevents the cryptocurrencies from being stolen from a blockchain network. That is, the present disclosure is a system and method that allow safe trading of cryptocurrencies on the blockchain.

BEST MODE

Figure 1:
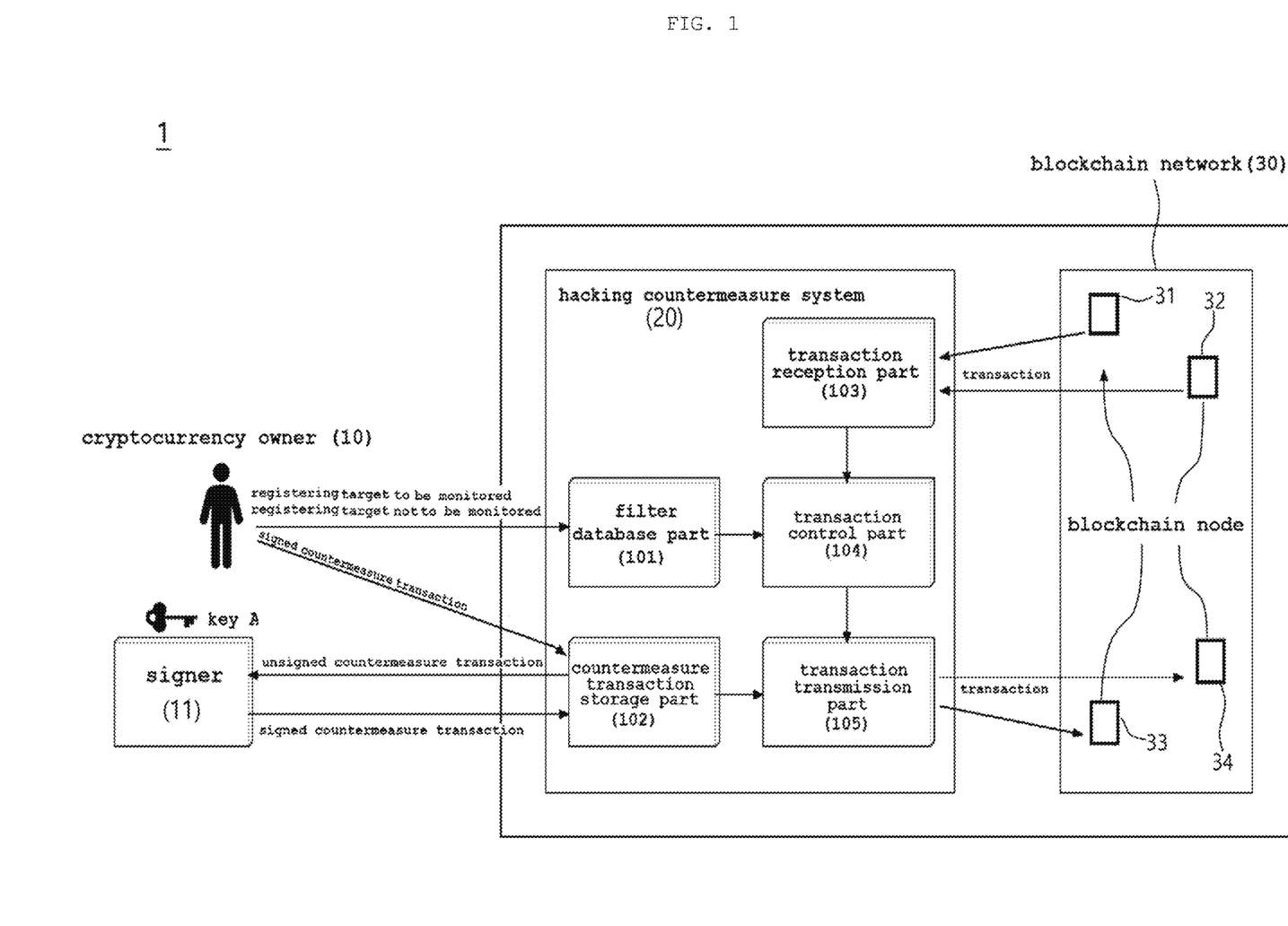
FIG. 1 is a block diagram illustrating a system for preventing suspicious transactions in a distributed ledger according to an exemplary embodiment of the present disclosure.

There are provided cryptocurrency information and a public key, which are received. In addition, a state of a cryptocurrency wallet is checked through the public key. For example, when the cryptocurrency wallet is an account that may store cryptocurrency, the public key is a key for checking an account number and total amounts of the cryptocurrency saved in the account.

In addition, a hacking countermeasure system 20 is characterized in that monitoring-subjected data is received so that the hacking countermeasure system 20 transmits a hacking countermeasure transaction to invalidate the hacking transaction when a hacking transaction that matches the monitoring-subjected data is received. In addition, when a monitoring-excluded transaction that matches monitoring-excluded data is received, the hacking countermeasure system 20 transmits the monitoring-excluded transaction to the blockchain network 30 so that the cryptocurrency is traded.

The blockchain network 30 receives transactions from the hacking countermeasure system 20, processes transaction details into a block file, and then duplicates the received block file into a plurality of block files. Thereafter, the plurality of duplicated block files is transmitted to and stored in a plurality of nodes 31 to 34. In this case, the plurality of nodes 31 to 34 may be nodes that are preset. As an example, each node may be a registered trader who is able to trade cryptocurrency with a cryptocurrency owner 10. In addition, the plurality of nodes 31 to 34 shares each block file and may be mutually verified. The blockchain network 30 having such characteristics may be formed by the blockchain that transacts the block files and guarantees data integrity.

Figure 2:
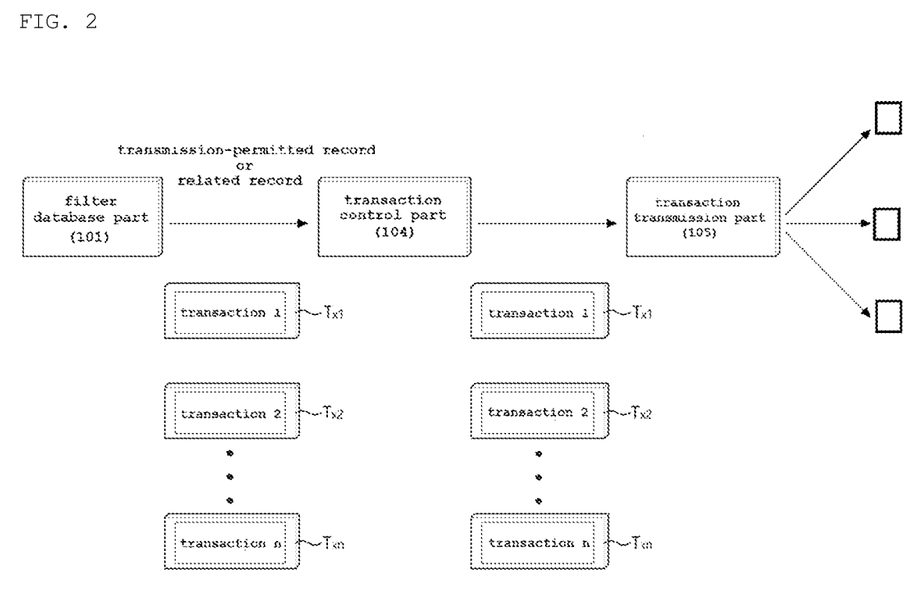
FIG. 2 is a view illustrating an operation process of a filter database part of the present disclosure.

Hereinafter, components of the hacking countermeasure system that is the main point of the characteristics of the present disclosure will be described in more detail. The hacking countermeasure system 20 includes a filter database part 101, a countermeasure transaction storage part 102, a transaction reception part 103, a transaction control part 104, and a transaction transmission part 105. Here, the filter database part 101 receives and stores monitoring-subjected data and monitoring-excluded data from a cryptocurrency owner 10. For example, as shown in FIG. 2, in the filter database part 101, pre-set information, that is, information on cryptocurrency owned by an owner, token information, transaction information that is explicitly approved by the owner, and the like, and transmission permission records may be set as the monitoring-excluded data. In addition other data may be set as the monitoring-subjected data. In this case, the data set in the filter database part 101 is used as important data for the transaction control part 104 to determine whether the cryptocurrency may be traded.

The countermeasure transaction storage part 102 stores hacking countermeasure transactions for setting transactions suspected of hacking as invalid or sub-priority transactions. Such a countermeasure transaction storage part 102 includes: a signature check transaction module configured to receive and store a private key from a cryptocurrency owner 10, or request a signature from the cryptocurrency owner 10 using the private key; and a hacking countermeasure transaction module configured to store a hacking countermeasure transaction that invalidates a hacking-suspected transaction or makes the hacking-suspected transaction a sub-priority transaction.

Figure 3:
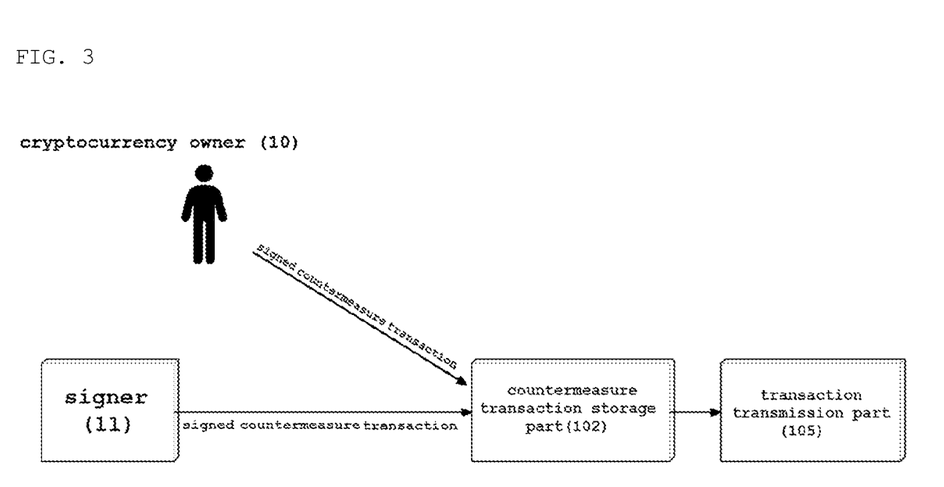
FIG. 3 is a view illustrating an operation process of a countermeasure transaction storage part of the present disclosure.

In this way, as shown in FIG. 3, the countermeasure transaction storage part 102 stores the countermeasure transactions signed in advance by the cryptocurrency owner 10 or transmits the signature check transaction to the cryptocurrency owner 10 whenever necessary so as to obtain a signature. In other words, the cryptocurrency owner 10 receives, from the countermeasure transaction storage part 102, a signature request transaction for requesting transmission of the private key, and allows the signature request transaction to be converted into a signed transaction by using the private key. In this case, the cryptocurrency owner 10 who signed to the signature check transaction by using the private key may be a signer 11.

The transaction reception part 103 receives a new transaction from the plurality of nodes 31 to 34 of the blockchain network 10.

The transaction control part 104 is connected to the filter database part 101, so as to receive the monitoring-subjected data and the monitoring-excluded data. In addition, the transaction control part 104 is connected to the transaction reception part 103, so as to receive transaction data, thereby comparing the transaction data with the monitoring-subjected data or the monitoring-excluded data. Such a transaction control part 104 determines, as a hacking-suspected attempt, a transaction attempting to change an address, a cryptocurrency, or an owner of a token, which are registered by the cryptocurrency owner 10. Whereas, a transaction explicitly approved by the cryptocurrency owner 10 is not considered as a hacking attempt.

Figure 4:
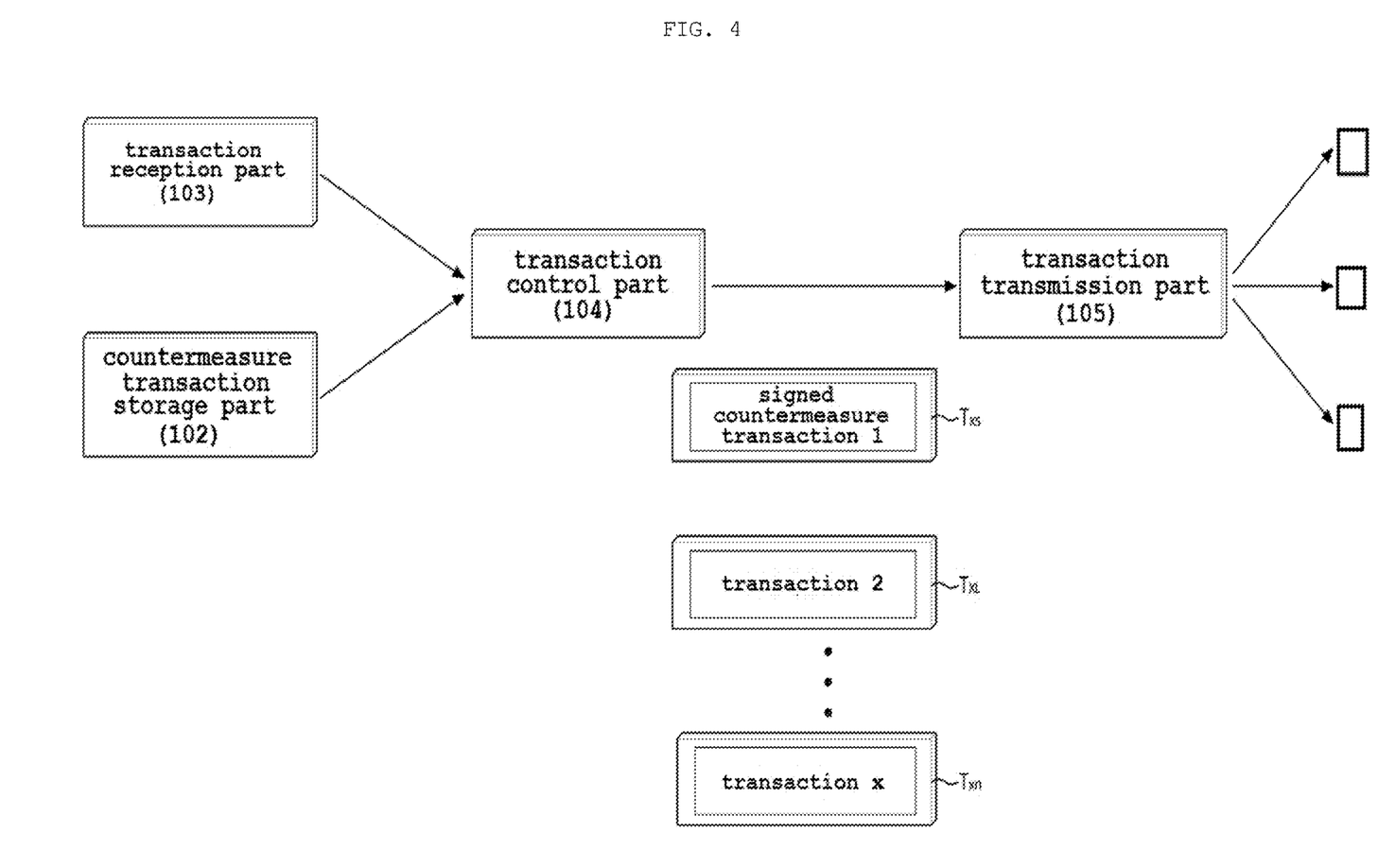
FIG. 4 is a view illustrating an operation process of a transaction control part of the present disclosure.

As described above, as shown in FIG. 4, through the characteristics of the transaction control part 104 configured to perform comparison between data, and determine whether a transaction is considered as a hack, the transaction control part 105 passes and transmits only the signed countermeasure transaction to the transaction transmission part 105.

In response to an operation result of the transaction control part 104, the transaction transmission part 105 transmits transaction details received by the transaction reception part 103, or transmits the hacking countermeasure transactions stored in the countermeasure transaction storage part 102 to the nodes of the blockchain network 30. In this case, the nodes of the blockchain network 30 allow a pending transaction to be included in a new block to be created and then compete to create the block by substituting nonce (number once) values in sequence. Then, the block is propagated to other nodes. Here, the nodes receive such a block and verify the validity of the block according to a preset standard. In addition, when the verification of the block is passed, the block is updated in respective electronic ledgers of the nodes.

More specifically, each node verifies whether the corresponding transaction is valid, and then stores the verified transaction in a mempool storage. Here, a priority of the verified transaction to be stored as the block in the mempool storage may be different for each node by criteria such as an order of higher transaction fees.

Figure 5:
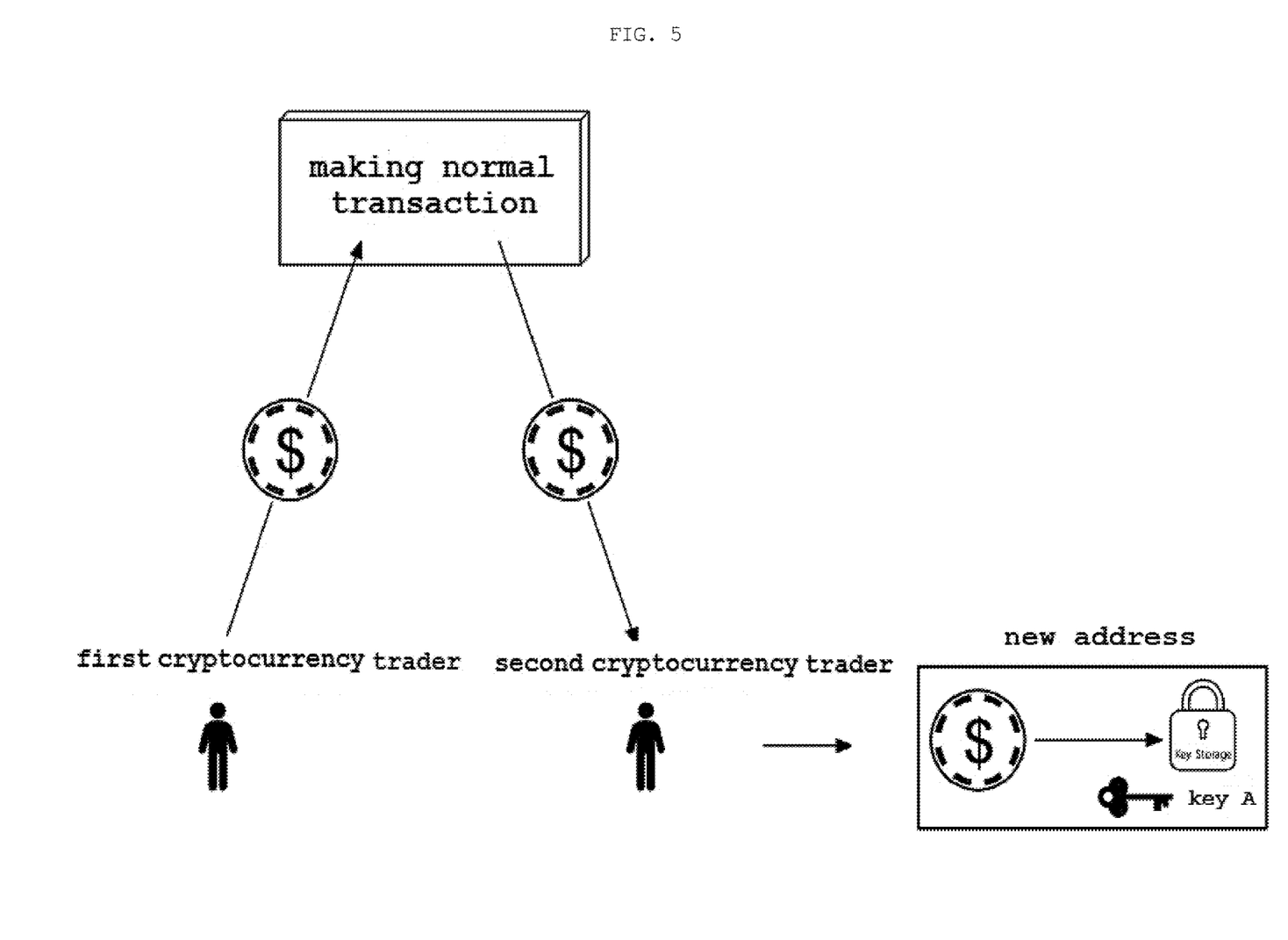
FIGS. 5 and 6 are views respectively illustrating processes of allowing a hacking countermeasure system to approve or disapprove a transaction of cryptocurrency.
Figure 6:
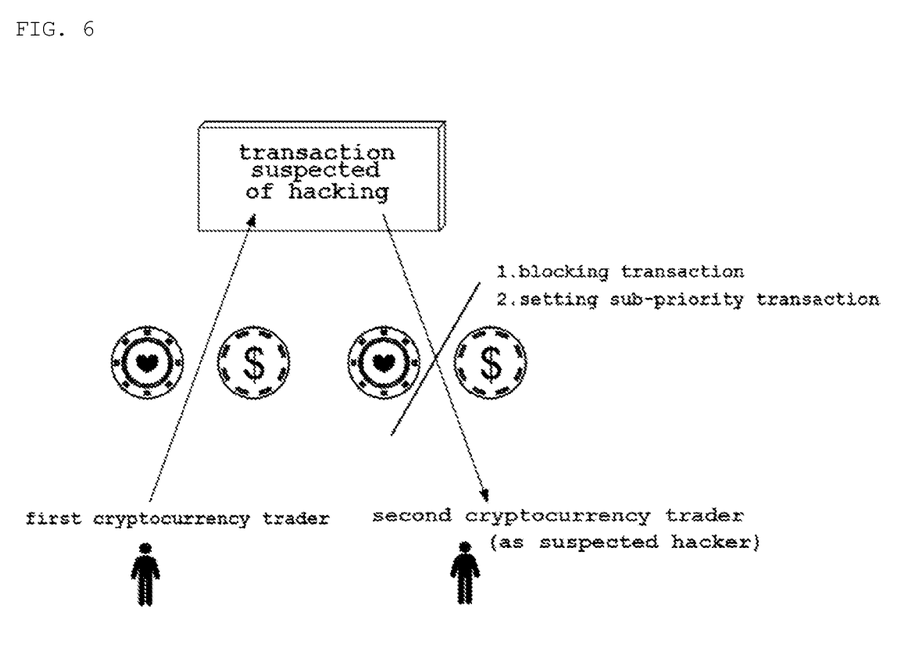

As shown in FIGS. 5 and 6, the system for preventing the suspicious transactions in the distributed ledger, the system being provided by a combination of the components having such characteristics, allows a cryptocurrency to be transferred from a first cryptocurrency trader to a second cryptocurrency through a normal transaction. Whereas, through a hacking-suspected transaction, a cryptocurrency is prevented to be transferred from the first cryptocurrency trader to the second cryptocurrency trader, so that the cryptocurrency is not stolen from the blockchain network. In this case, the cryptocurrency may be transferred and stored in a secure cryptocurrency wallet predetermined by the cryptocurrency owner. That is, the cryptocurrency is allowed to be safely traded on the blockchain.

Figure 7:
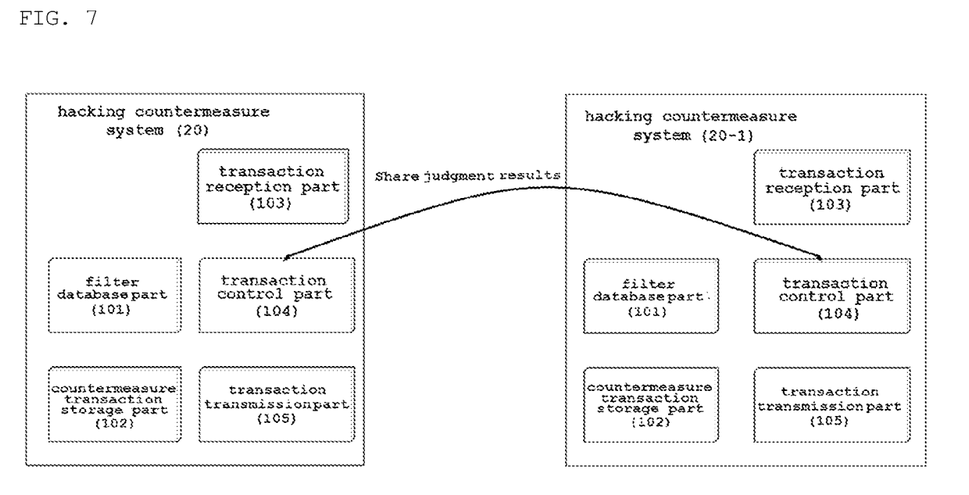
FIG. 7 is a view illustrating a state in which the transaction control parts of a plurality of hacking countermeasure systems are connected to each other.

In addition, a plurality of hacking countermeasure systems of the system for preventing the suspicious transactions in the distributed ledger is provided and may be connected to each other through the transaction control part.

In this way, a transaction processed in one hacking countermeasure system 20 may be transmitted to the other hacking countermeasure system 20-1, or a transaction processed in the other hacking countermeasure system 20-1 may be transmitted to the one hacking countermeasure system 20.

That is, the plurality of hacking countermeasure systems shares a determination result of each transaction control part, and when one transaction control part detects a hacking-suspected transaction, the detected fact may be transmitted to the other transaction control part. At the same time, information on the hacking-suspected transaction is shared with nodes connected to the one hacking countermeasure system and nodes connected to the other hacking countermeasure system, so that the cryptocurrency may be traded more safely.

Although the exemplary embodiments of the present disclosure have been described above with reference to the accompanying drawings, it will be understood that those skilled in the art to which the present disclosure pertains may implement the present disclosure in other specific forms without departing from the technical spirit or essential features thereof. Therefore, the exemplary embodiments described above are to be understood in all respects as illustrative and not restrictive.

The invention claimed is:

1. A method for preventing suspicious transactions in a distributed ledger, the method comprising:
    step (A) of creating a cryptocurrency wallet storing a cryptocurrency, a public key, and a private key, and setting monitoring-subjected data suspected of being hacked and monitoring-excluded data not suspected of being hacked;
    step (B) of checking, by a hacking countermeasure system (20), status of the cryptocurrency wallet, invalidating a hacking transaction by using a hacking countermeasure transaction when the monitoring-subjected data is received and the hacking transaction matching the monitoring-subjected data is received, and allowing the cryptocurrency to be traded and transmitting transaction details when a monitoring-excluded transaction matching the monitoring-excluded data is received; and
    step (C) of receiving, by a blockchain network (30), transactions from the hacking countermeasure system (20) to process the transaction details into a block file, and then duplicating the block file into a plurality of block files to distribute and store each block file in a plurality of nodes (31 to 34) sharing each block file,
wherein the step (B) of checking comprises:
    receiving and storing the monitoring-subjected data and the monitoring-excluded data;
    receiving and storing the private key, or requesting a signature by using the private key, and invalidating a hacking-suspected transaction;
    receiving transaction data transmitted from the plurality of nodes (31 to 34);
    receiving the monitoring-subjected data and the monitoring-excluded data, and receiving the transaction data, thereby comparing the transaction data with the monitoring-subjected data or the monitoring-excluded data; and
    transmitting, to the blockchain network (30), the transaction data or the hacking countermeasure transaction in response to an operation result, and
    wherein, when a signature request transaction, which requests transmission of the private key, is received, converting the signature request transaction into a signed transaction by using the private key,
wherein the step (C) of receiving comprises:
    receiving transaction details or hacking countermeasure transactions from the hacking countermeasure system (20);

allowing a pending transaction to be included in a new block to be created and then competing to create the block by substituting nonce values in sequence, propagating the block to other nodes, and updating the block in respective electronic ledgers of the nodes after the block is verified passed; and verifying at each node whether a particular transaction is valid, and then storing the verified particular transaction in a mempool storage, wherein a priority of the verified particular transaction to be stored as the block in the mempool storage is higher for each node by criteria including an order of higher transaction fees.

* * * * *